(12) United States Patent
Olsson et al.

(10) Patent No.: US 7,844,250 B2
(45) Date of Patent: Nov. 30, 2010

(54) DIFFERENTIATED CHARGING IN PACKET DATA NETWORKS

(75) Inventors: Lars-Bertil Olsson, Angered (SE); Lars Lövsén, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 925 days.

(21) Appl. No.: 10/596,014

(22) PCT Filed: Nov. 26, 2003

(86) PCT No.: PCT/SE03/01829

§ 371 (c)(1),
(2), (4) Date: Mar. 5, 2007

(87) PCT Pub. No.: WO2005/053224

PCT Pub. Date: Jun. 9, 2005

(65) Prior Publication Data

US 2007/0162289 A1    Jul. 12, 2007

(51) Int. Cl.
*H04M 11/00* (2006.01)
*H04W 4/00* (2009.01)
(52) U.S. Cl. .......... 455/408; 455/405; 455/406; 455/466
(58) Field of Classification Search .......... 455/405, 455/406, 407, 408, 404.1, 466; 370/230, 370/395.43; 379/114.03, 126; 705/1, 34
See application file for complete search history.

(56) References Cited

U.S. PATENT DOCUMENTS

| | | | |
|---|---|---|---|
| 7,023,825 B1* | 4/2006 | Haumont et al. | 370/338 |
| 2002/0058496 A1* | 5/2002 | Bos et al. | 455/406 |
| 2002/0127995 A1 | 9/2002 | Faccin | |
| 2003/0120499 A1* | 6/2003 | MacLean et al. | 705/1 |
| 2003/0125013 A1* | 7/2003 | Mizell et al. | 455/408 |
| 2004/0266394 A1* | 12/2004 | Mizell et al. | 455/408 |
| 2008/0096523 A1* | 4/2008 | Lundin et al. | 455/406 |

FOREIGN PATENT DOCUMENTS

| | | |
|---|---|---|
| EP | 1096743 A1 | 5/2001 |
| WO | WO 03047164 A2 | 6/2003 |

OTHER PUBLICATIONS

3GPP TS 32.215 V 4.5.0 Techinical Specification Group Services and System Aspects; Telecommunication management; Charging management; Charging data description for the Packet Switched (PS) domain; (Release 4). Sep. 2003.
3GPP TS 29.060 v 6.2.0 Techinical Specification Group Services and System Aspects; General Packet Radio Service GPRS; GPRS Tunneling Protocol (GTP) across the Gn and GP interface (Release 6) Sep. 2003.

\* cited by examiner

*Primary Examiner*—George Eng
*Assistant Examiner*—Bryan Pitt

(57) ABSTRACT

Method and nodes involving communicating charging information (CI) in a network comprising at least a serving node (SGSN) and a gateway node (GGSN) wherein charging information (CI) relating to a particular PDP context for a given mobile station is gathered in the gateway node and transmitted in a GTP header extension to a serving node (SGSN).

7 Claims, 14 Drawing Sheets

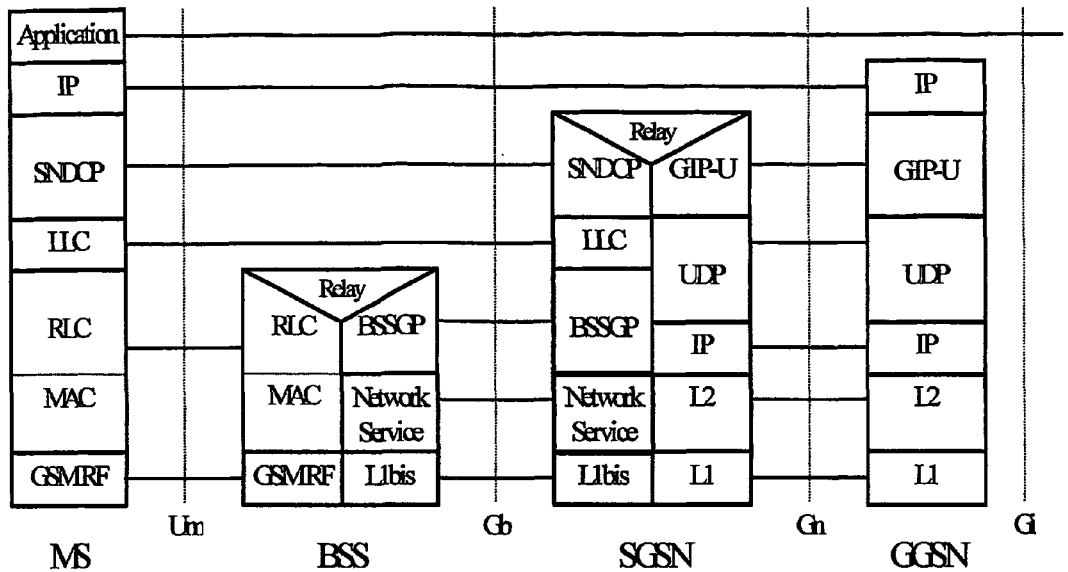
Fig. 2 – prior art
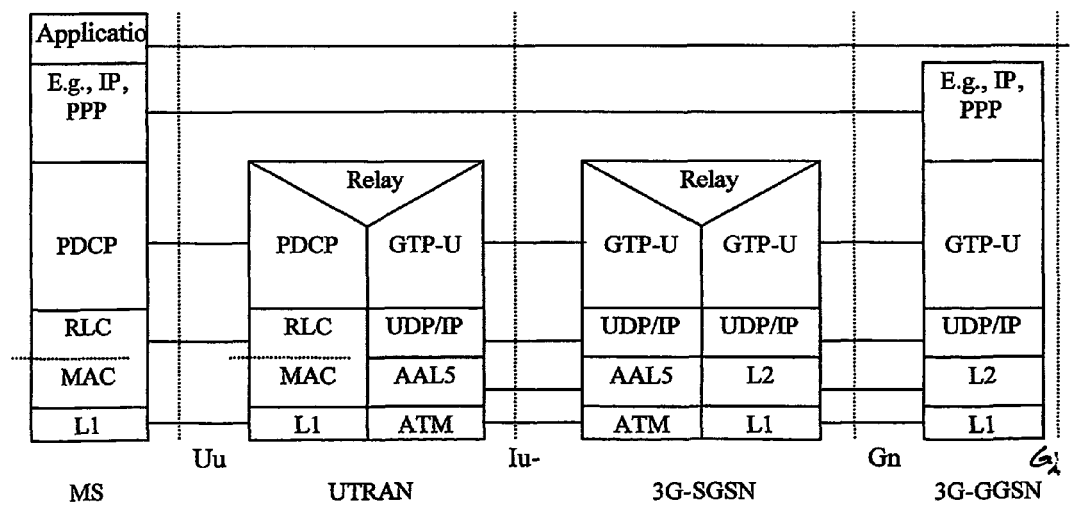
Fig. 3 – prior art

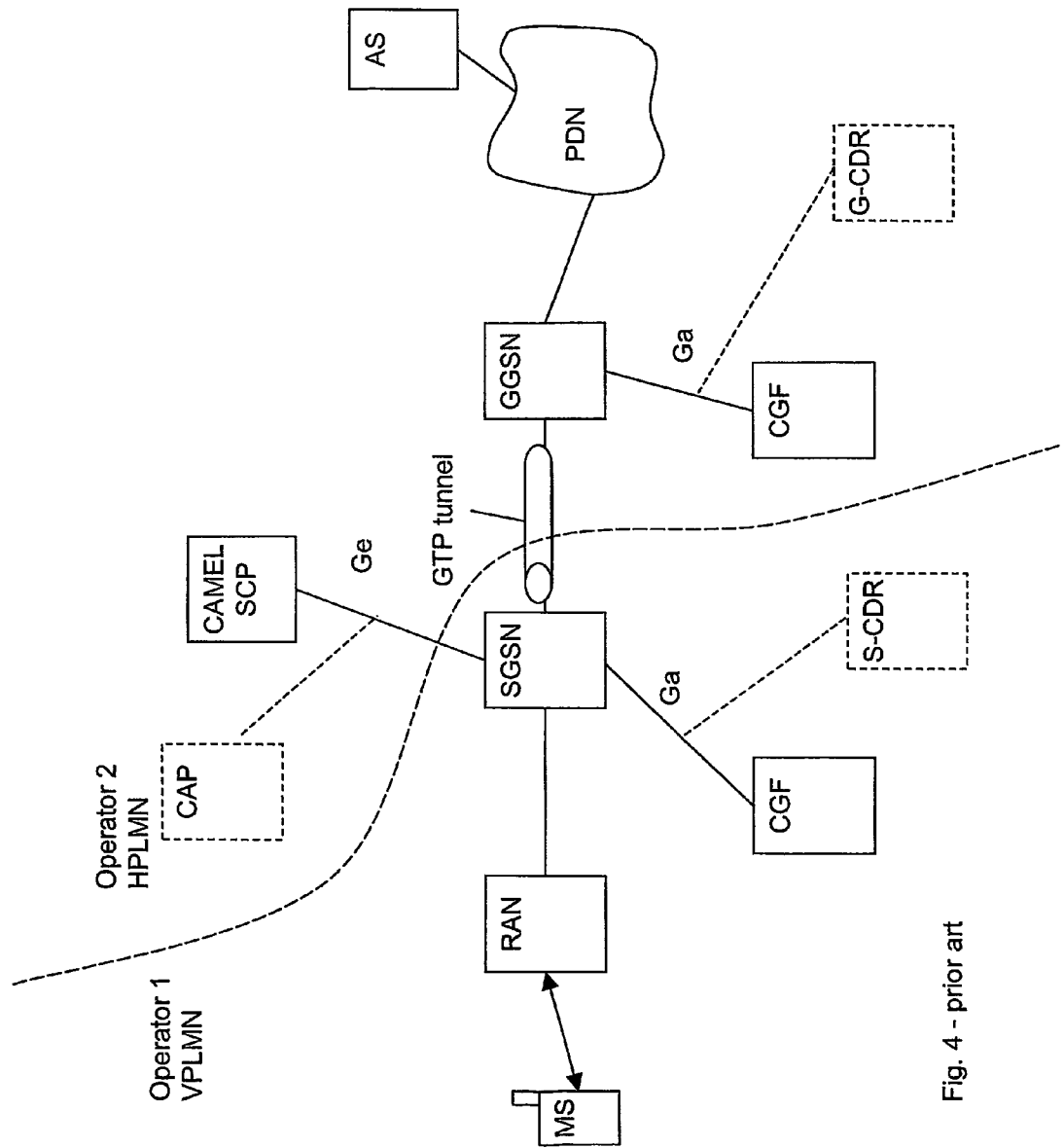
Fig. 4 - prior art

| Octets | 8 | 7 | 6 | 5 | 4 | 3 | 2 | 1 |
|---|---|---|---|---|---|---|---|---|
| 1 | Version | | | PT | (*) | E | S | PN |
| 2 | Message Type ||||||||
| 3 | Length (1st Octet) ||||||||
| 4 | Length (2nd Octet) ||||||||
| 5 | Tunnel Endpoint Identifier (1st Octet) ||||||||
| 6 | Tunnel Endpoint Identifier (2nd Octet) ||||||||
| 7 | Tunnel Endpoint Identifier (3rd Octet) ||||||||
| 8 | Tunnel Endpoint Identifier (4th Octet) ||||||||
| 9 | Sequence Number (1st Octet) ||||||||
| 10 | Sequence Number (2nd Octet) ||||||||
| 11 | N-PDU Number ||||||||
| 12 | Next Extension Header Type ||||||||

Fig. 5 - prior art

| Octets | |
|---|---|
| 1 | Extension Header Length |
| 2 - m | Extension Header Content |
| m+1 | Next Extension Header Type (*) |

Fig. 6 - prior art

| Bits 8 7 | Meaning |
|---|---|
| 0  0 | Comprehension of this extension header is not required. An Intermediate Node shall forward it to any Receiver Endpoint |
| 0  1 | Comprehension of this extension header is not required. An Intermediate Node shall discard the Extension Header Content and not forward it to any Receiver Endpoint. Other extension headers shall be treated independently of this extension header. |
| 1  0 | Comprehension of this extension header is required by the Endpoint Receiver but not by an Intermediate Node. An Intermediate Node shall forward the whole field to the Endpoint Receiver. |
| 1  1 | Comprehension of this header type is required by recipient (either Endpoint Receiver or Intermediate Node) |

Fig. 7 - prior art

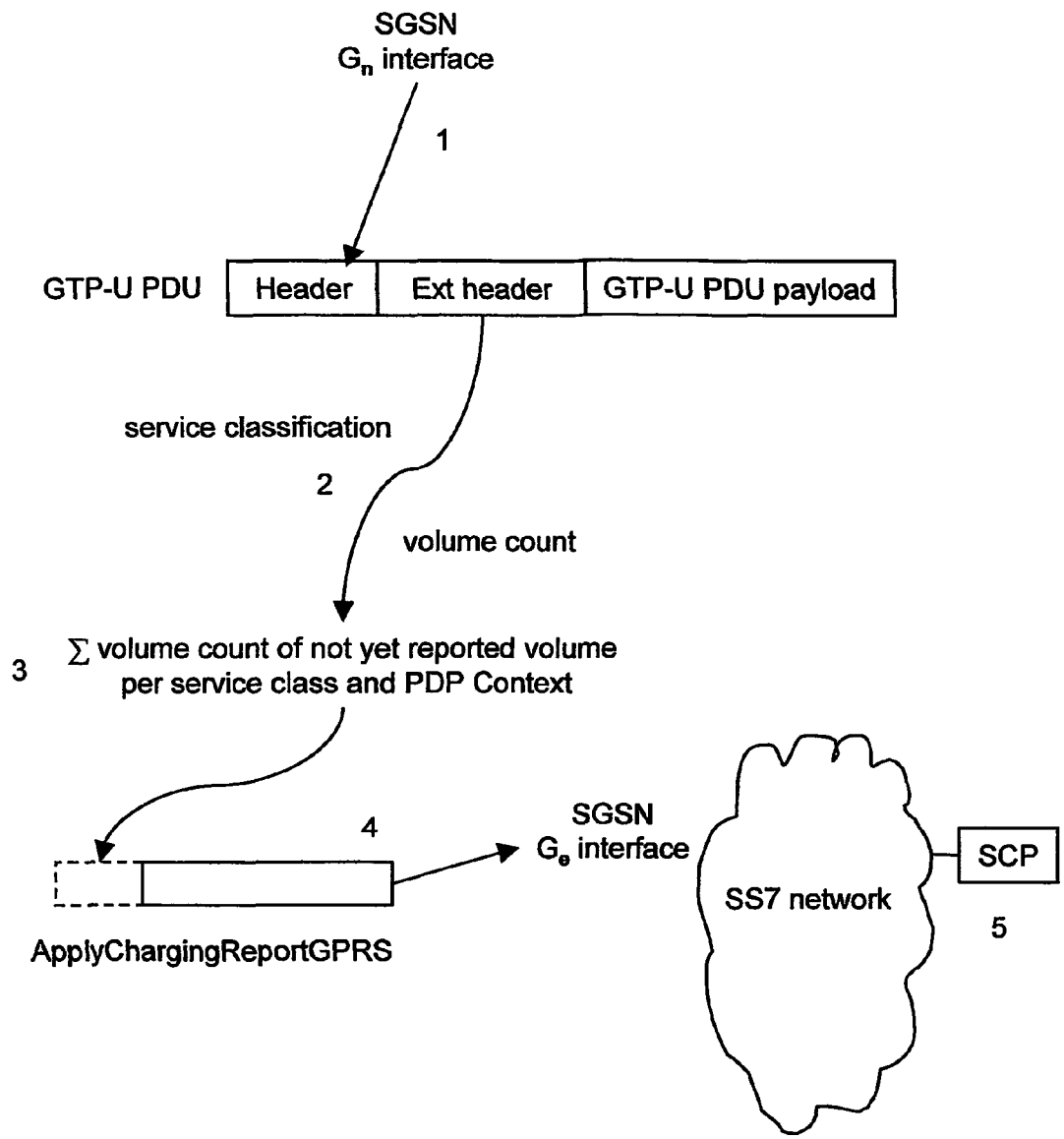
Fig.IIa

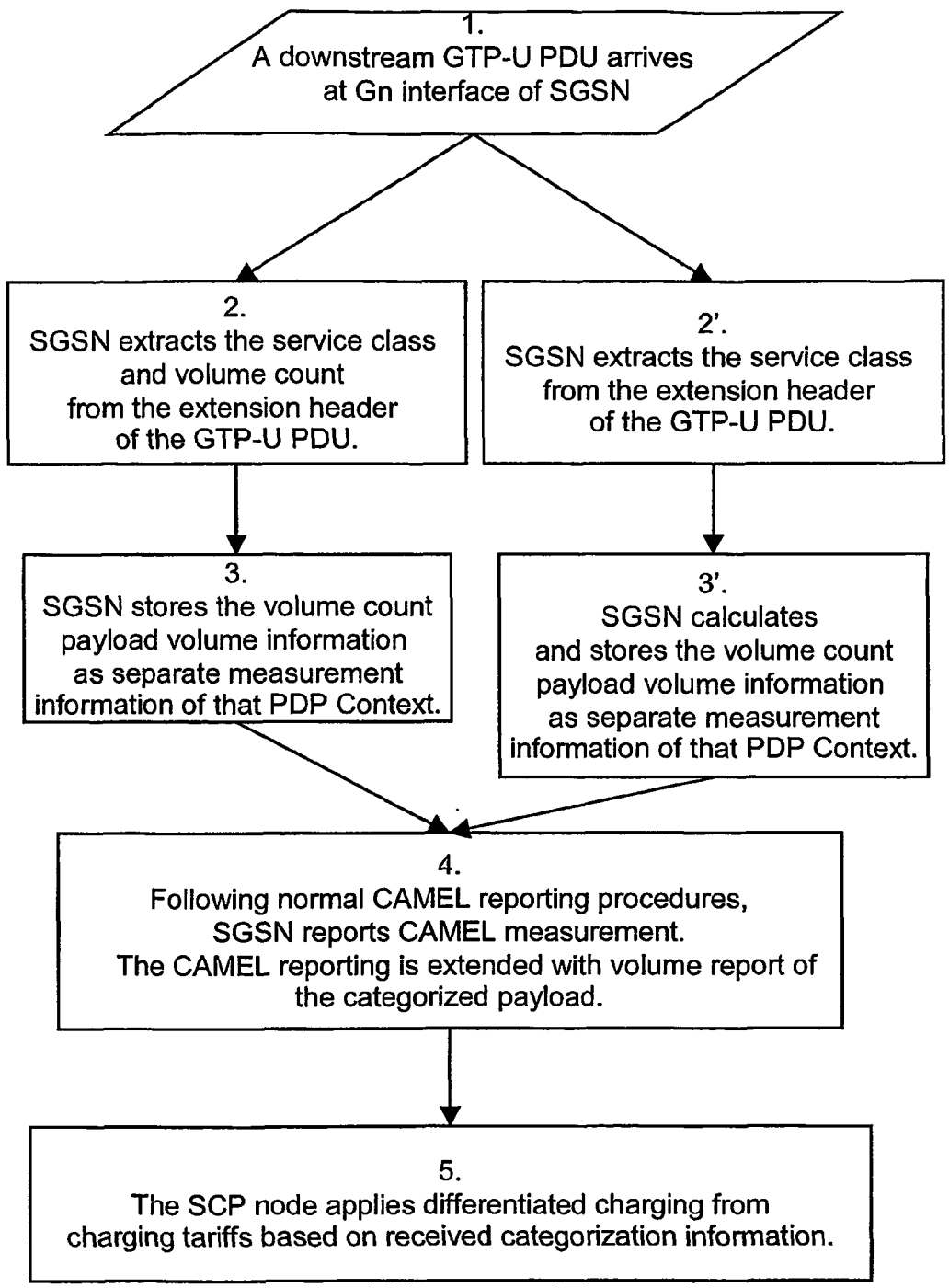
Fig. IIb

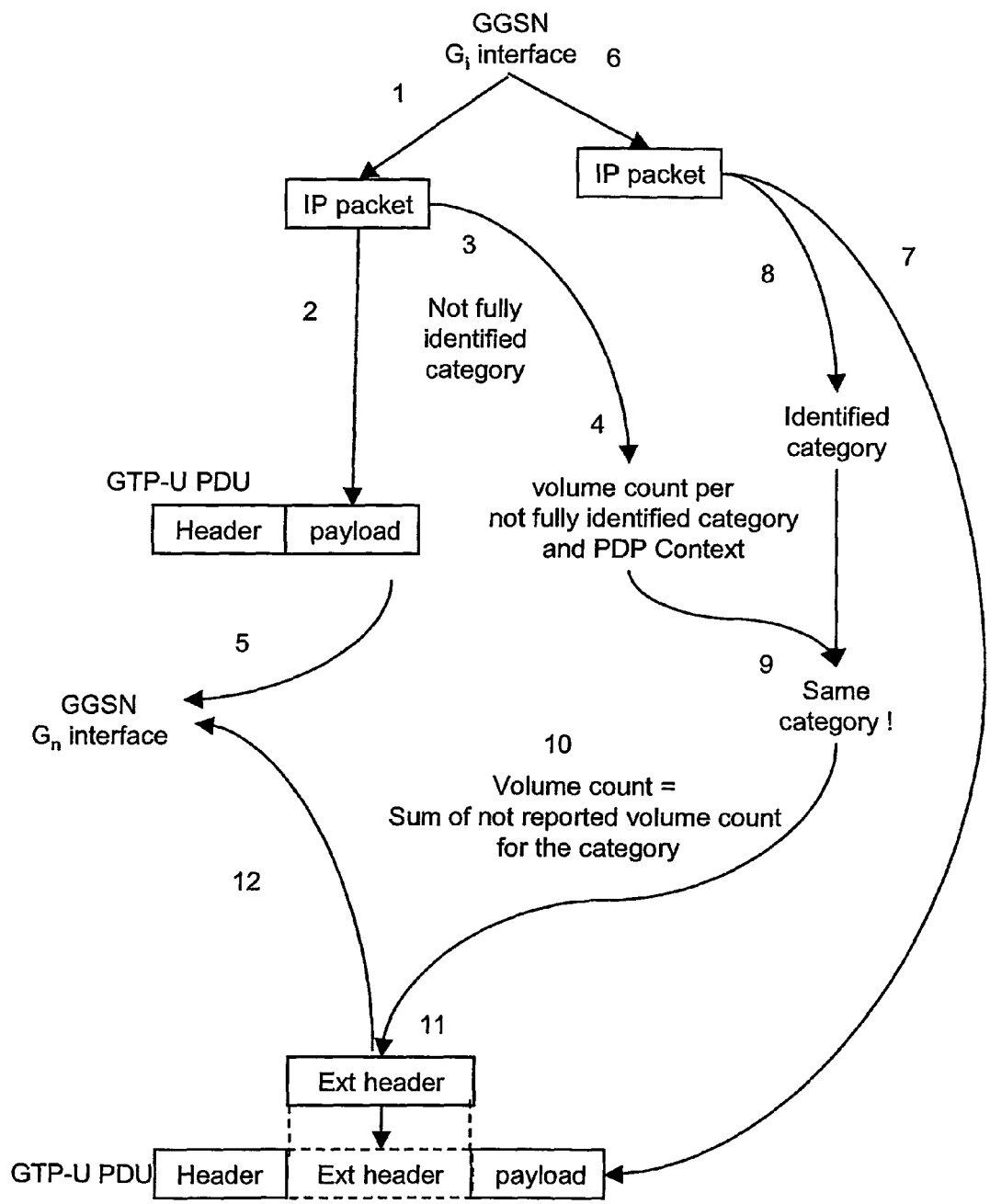
Fig. IIIa

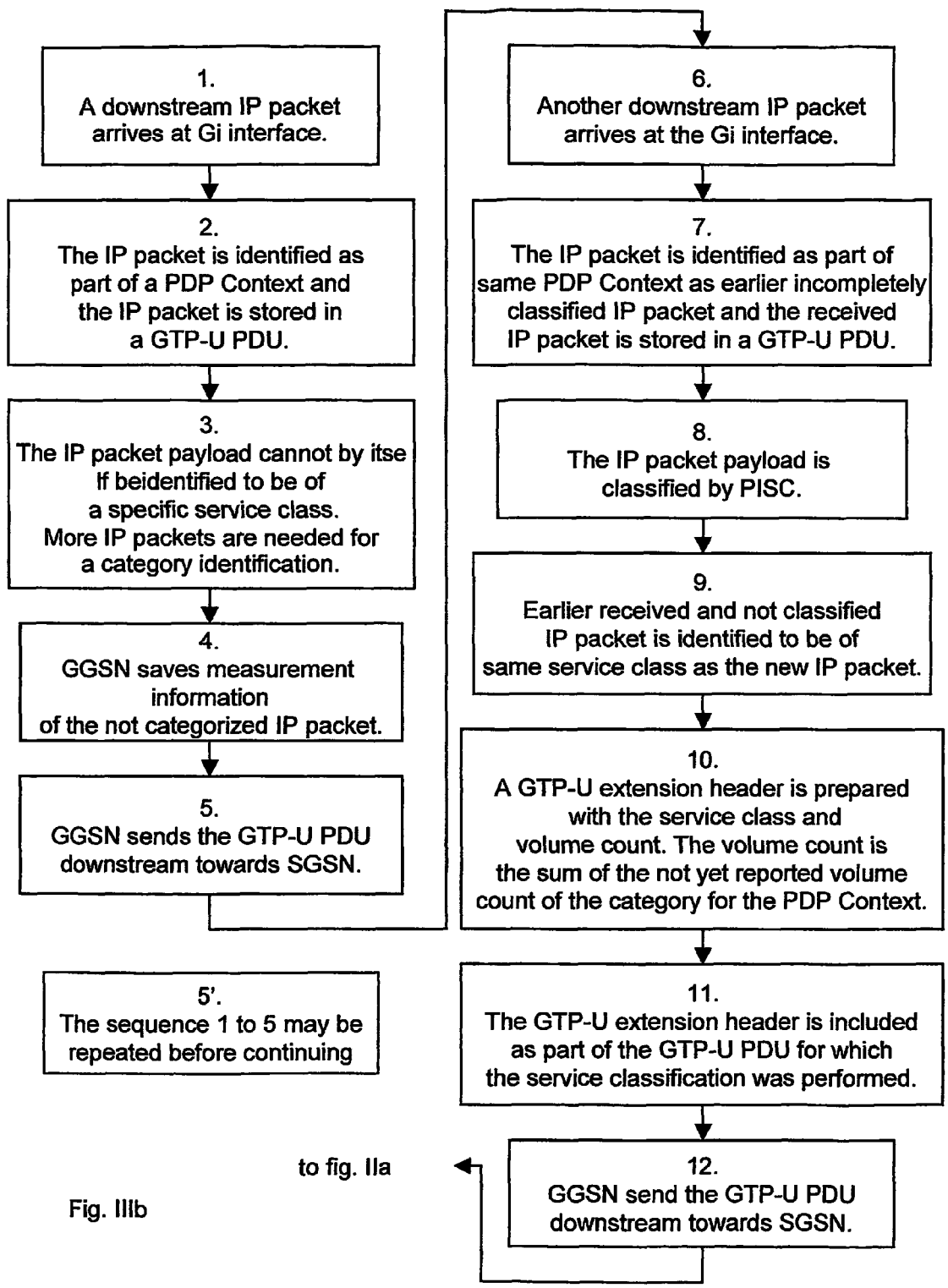
Fig. IIIb

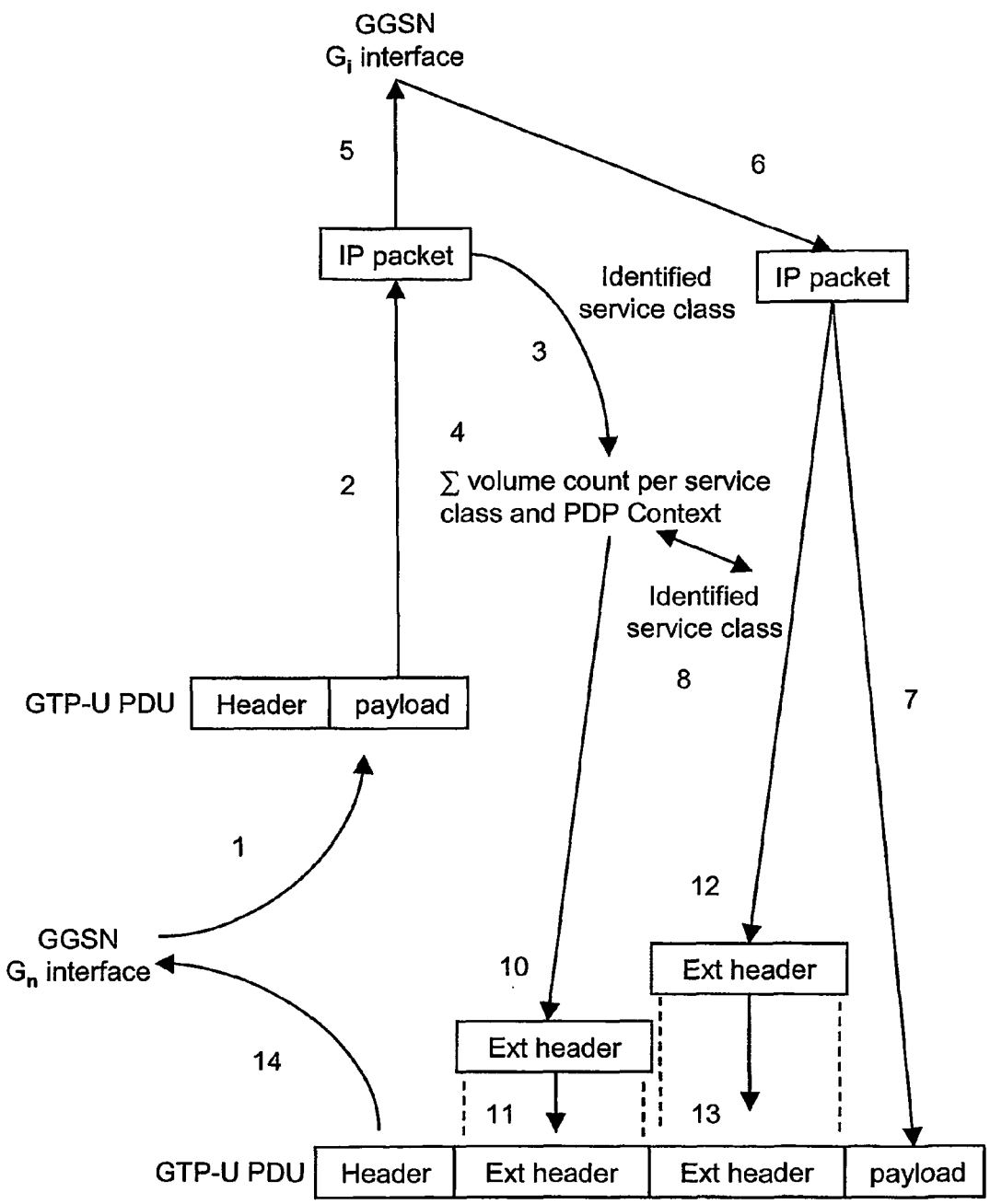
Fig. IVa

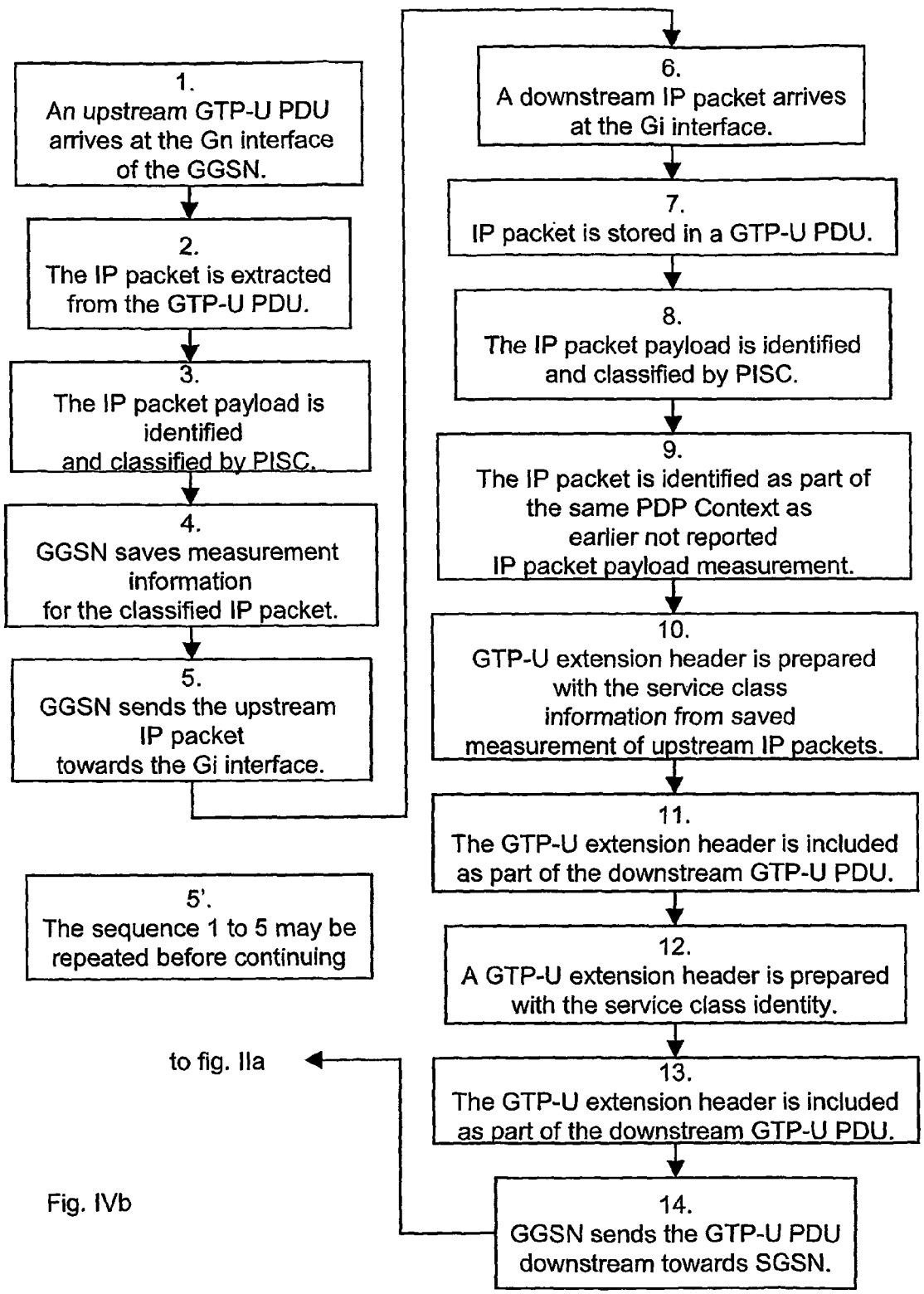
Fig. IVb

DIFFERENTIATED CHARGING IN PACKET DATA NETWORKS

FIELD OF THE INVENTION

This invention pertains to the area of charging in mobile packet data networks. More particular, the invention relates to real time based differentiated charging of pre-paid services in General Packet Radio Services (GPRS) networks.

BACKGROUND OF THE INVENTION

As in most businesses it is important for telecom operators to price differentiate services to their users in order to maximise profits. Parameters such as duration of telephone conversation, user class of service, distance, time of day of conversation and user service classes have been used in pricing models allowing for high a capacity utilisation. Recently, the advent of GPRS has made it possible to charge customers, according to the amount of data, which is transmitted to and from the mobile terminal in question, such that the user is not charged for downtime and interruptions.

Mobile pre-paid subscriptions, i.e. a subscription type involving a fixed credit limit often associated with the acquisition of a "pre-paid" SIM card, have recently shown strong growth. As opposed to traditional subscribers, which can be billed after the service is delivered, operators need the ability to terminate services to pre-paid customers in case the credit limit of a given user is reached. Since the service delivered to the user may involve many operators, possibly virtual operators, an exact and prompt measurement of service utilisation is therefore needed. Pre-paid services, has therefore necessitated an ability to charge in "real time".

It is believed that new services such as MMS will be one important driver for the change to 3G networks. A consistent pricing model of such services is believed to be important for users to adopt them. Advantageously, the user should expect a fixed "low" price level for transmitting a MMS, such that the service is perceived as being equivalent to other competing services, such as sending a post card. It is noted that a picture of a given resolution may be of varying data size depending on the coding principle and the motive captured.

According to the 3'rd generation partnership project (3GPP) technical specification, 3G TS 23.060 a common packet domain Core Network is used for both GSM and UMTS. Such a system has been shown in FIG. 1. A similar system has been shown in WO99/05828.

The above Core Network provides packet-switched (PS) services and is designed to support several quality of service levels in order to allow efficient transfer of non real-time traffic (e.g., intermittent and bursty data transfers, occasional transmission of large volumes of data) and real-time traffic (e.g., voice, video). One class of quality of service pertains to a low throughput and a low delay; another class pertains to higher throughput and longer delay and a further class pertains to relatively long delays and high through-put.

Applications based on standard data protocols and SMS are supported, and interworking is defined with IP networks. Charging is rendered flexible and allows Internet Service Providers to bill according to the amount of data transferred, the QoS supported, and the duration of the connection.

Each PLMN has two access points, the radio interface (labelled Um in GSM and Uu in UMTS) used for mobile access and the R reference point used for origination or reception of messages.

An interface differs from a reference point in that an interface is defined where specific information is exchanged and needs to be fully recognised. There is an inter PLMN interface called Gp that connects two independent packet domain networks for message exchange. There is also a PLMN to fixed network (typically a packet data network) reference point called Gi.

There may be more than a single network interface to several different packet data (or other) networks. These networks may both differ in ownership as well as in communications protocol (e.g., TCP/IP etc.). The network operator should define and negotiate interconnect with each external (PDN or other) network.

Network interworking is required whenever a packet domain PLMN and any other network are involved in the execution of a service request. With reference to FIG. 1, interworking takes place through the Gi reference point and the Gp interface.

The internal mechanism for conveying the PDP (Packet Data Protocol) PDU (Packet Data Unit) through the PLMN is managed by the PLMN network operator and is not apparent to the data user. The use of the packet domain data service may have an impact on and increase the transfer time normally found for a message when communicated through a fixed packet data network.

The packet domain supports interworking with networks based on the Internet protocol (IP). The packet domain may provide compression of the TCP/IP header when an IP datagram is used within the context of a TCP connection.

The packet domain PLMN service is an IP domain, and mobile terminals offered service by a service provider may be globally addressable through the network operator's addressing scheme.

A GPRS Support Node (GSN) contains functionality required to support GPRS functionality for GSM and/or UMTS. In one PLMN, there may be more than one GSN.

The Gateway GPRS Support Node (GGSN) is the node that is accessed by the packet data network due to evaluation of the PDP address. It contains routing information for PS-attached users. The routing information is used to tunnel N-PDUs to the MS's current point of attachment, i.e., the Serving GPRS Support Node. The GGSN may request location information from the HLR via the optional Gc interface. The GGSN is the first point of PDN interconnection with a GSM PLMN supporting GPRS (i.e., the Gi reference point is supported by the GGSN). GGSN functionality is common for GSM and UMTS.

The Serving GPRS Support Node (SGSN) is the node that is serving the MS. The SGSN supports GPRS for GSM (i.e., the Gb interface is supported by the SGSN) and/or UMTS (i.e., the Iu interface is supported by the SGSN).

In order to access the PS services, an MS shall first make its presence known to the network by performing a GPRS Attach. This makes the MS available for SMS over PS, paging via the SGSN, and notification of incoming PS data. According to the Attach, the IMSI (International Mobile Subscription Identity) of the mobile station (MS) is mapped to one or more packet data protocol addresses (PDP).

At PS Attach, the SGSN establishes a mobility management context containing information pertaining to e.g., mobility and security for the MS.

In order to send and receive PS data, the MS shall activate the Packet Data Protocol context that it wants to use. This operation makes the MS known in the corresponding GGSN, and interworking with external data networks can commence.

At PDP Context Activation, the SGSN establishes a PDP context, to be used for routing purposes, with the GGSN that the subscriber will be using.

According to the PDP context activation, a network bearer (IP) communication between the mobile station and for instance the Internet service provider (ISP) may be established. Moreover, a given class of Quality of Service is assigned for the communication to be performed.

The SGSN and GGSN functionalities may be combined in the same physical node, or they may reside in different physical nodes. SGSN and GGSN contain IP or other (operator's selection, e.g., ATM-SVC) routing functionality, and they may be interconnected with IP routers. In UMTS, the SGSN and RNC may be interconnected with one or more IP routers. When the SGSN and the GGSN are in different PLMNs, they are interconnected via the Gp interface. The Gp interface provides the functionality of the Gn interface, plus security functionality required for inter-PLMN communication. The security functionality is based on mutual agreements between operators.

The SGSN may send location information to the MSC/VLR via the optional Gs interface. The SGSN may receive paging requests from the MSC/VLR via the Gs interface.

The SMS-GMSCs and SMS-IWMSCs support SMS transmission via the SGSN. Optionally, the MSC/VLR can be enhanced for more-efficient co-ordination of packet-switched and circuit-switched services and functionality: e.g., combined GPRS and non-GPRS location updates.

User data is transferred transparently between the MS and the external data networks with a method known as encapsulation and tunnelling: data packets are equipped with PS-specific protocol information and transferred between the MS and the GGSN. This transparent transfer method lessens the requirement for the PLMN to interpret external data protocols, and it enables easy introduction of additional interworking protocols in the future.

An Application Server (AS) is connected to the Packet Data Network (PDN) for providing information. An Internet Service Provider (ISP), the PLMN, or an independent company may own the application server. The application server may offer MMS.

The packet domain logical architecture, as defined in 3GPP TS 23.060, defines the protocols involved in the various nodes. FIG. 2 shows the user plane protocol stacks, as defined in the 3GPP TS 23.060 for GSM. FIG. 3 shows the user plane protocol stacks, as defined in the 3GPP TS 23.060 for UMTS.

In both cases shown in FIGS. 2 and 3, the GTP-U protocol conveys both uplink and downlink payload between SGSN and GGSN nodes, the Gn (or Gp in a roaming situation) interface. FIGS. 2 and 3 shall not be explained further as their content is well known in the art.

Charging

In a mobile packet data network, real-time pre-paid charging may rely on the use of CAMEL as standardized in 3GPP TS 22.078, 23.078 and 29.078.

In FIG. 4, the charging performed in known GPRS networks have been further illustrated. As appears from the figure, the SGSN may belong to a first operator 1—which may be denoted as a visitor public land mobile network (VPLMN) and the GGSN may belong to a second operator 2—which may be denoted as a home public land mobile network (HPLMN). This node may for instance belong to operator 2.

Respective Charging Gateway Functionality (CGF) in individual nodes collects charging records from SGSNs and GGSNs. The HLR (Home Location Register) contains GSM and UMTS subscriber information. The HLR stores the IMSI (International Mobile Subscription Identity) and maps the IMSI to one or more packet data protocol addresses (PDP) and maps each PDP address to one GGSN.

The SGSN provides S-CDR (SGSN Charging Data Record) charging reports relating to transmitted traffic according to a PDP context to a CGF. The S-CDR reporting is not performed on a real time basis, and hence inapt for real time charging.

The GGSN also performs collection of charging information on the same traffic relating to a given PDP context, travelling through the GGSN by providing G-CDR (GGSN Charging Data Record) reports. The amount of traffic may be slightly different from the measurements performed in the SGSN. The G-CDR reporting is not performed on a real time basis.

As indicated in FIG. 4, a CAMEL SCP (Service Control Point) node collects charging reports over the Ge interface using the Camel Application Part (CAP) protocol. The CAMEL standard caters for reporting transferred payload volume as a single measurement, uplink and downlink together. The CAMEL interaction (Ge interface) reports the appropriate PDP context resource utilization to a pre-paid system (CAMEL GSM-SCF). The SGSN however lacks the ability to discriminate different kinds of payload flowing through the PDP context.

The prime basis for charging in a mobile packet data network (GPRS in GSM and UMTS networks) is anticipated—and indicated by operators—to be the amount of transmitted payload in a PDP context. According to 3GPP TS 32.200, it is the "Usage of the radio interface" that is to be measured, i.e. measurements are performed on the SNDCP layer (Gb interface) for GSM and on the GTP-U layer (Iu interface) for UMTS.

Services may be charged for separately, but still provided through the same PDP context. The payload required to provide the service should not (normally) be accounted for with respect to amount of payload to charge.

A known Packet Inspection and Service Classification (PISC) system interacting with a GGSN node has been provided and sold by Ericsson under the name "Flexible Bearer Charging (FBC) system". Currently, such systems are dealt with under the designation Traffic Plane Function (TPF) in 3GPP TR 23.825. The PICS system performs packet inspections for given PDP contexts and assesses the given class of service used for the given PDP context. Based on the inspection, the FBC functionality provides reports of the volume of traffic for the given class of services provided. The FBC may provide volume and class for each PDP packet sent or received in a given PDP context.

The GGSN lacks a standardized real time charging interface towards a pre-paid system. The GGSN moreover lacks a control mechanism to be used for shutting down a PDP context, when the user account is empty.

FIGS. 5, 6 and 7 show various known GTP header formats as defined in 3GPP TS 29.060.

SUMMARY OF THE INVENTION

It is a first object of the invention to set forth a method for a more efficient monitoring of charging in a mobile packet data network.

It is a second object of the invention to set forth a packet data unit enabling a more efficient monitoring of charging in a mobile packet data network.

It is a third object of the invention to set forth a gateway node providing a more efficient monitoring of charging in a mobile packet data network.

It is a fourth object of the invention to set forth a serving node providing a more efficient monitoring of charging in a mobile packet data network.

It is a fifth object to set forth a gateway node that provides for charging in a mobile packet data network, in cases where service classification cannot be performed momentarily.

According to the invention true real-time control over resource usage is achieved in both HPLMN and VPLMN. Both HPLMN and VPLMN operator's non-chargeable network traffic is reduced compared to near real-time charging solutions.

Further objects and advantages will appear from the following detailed description of the invention.

BRIEF DESCRIPTION OF THE DRAWINGS

FIGS. 2 and 3 shows known user plane protocol stacks for GSM and UMTS, respectively, FIG. 4 discloses a known CAMEL reporting procedure, FIG. 5 shows the prior art GTP PDU header format, FIG. 6 shows the prior art extension header format for the GTP PDU format, FIG. 7 shows the status for respective bit settings for the next extension header type of FIG. 5.

DESCRIPTION OF A FIRST PREFERRED EMBODIMENT OF THE INVENTION

Figure 1:
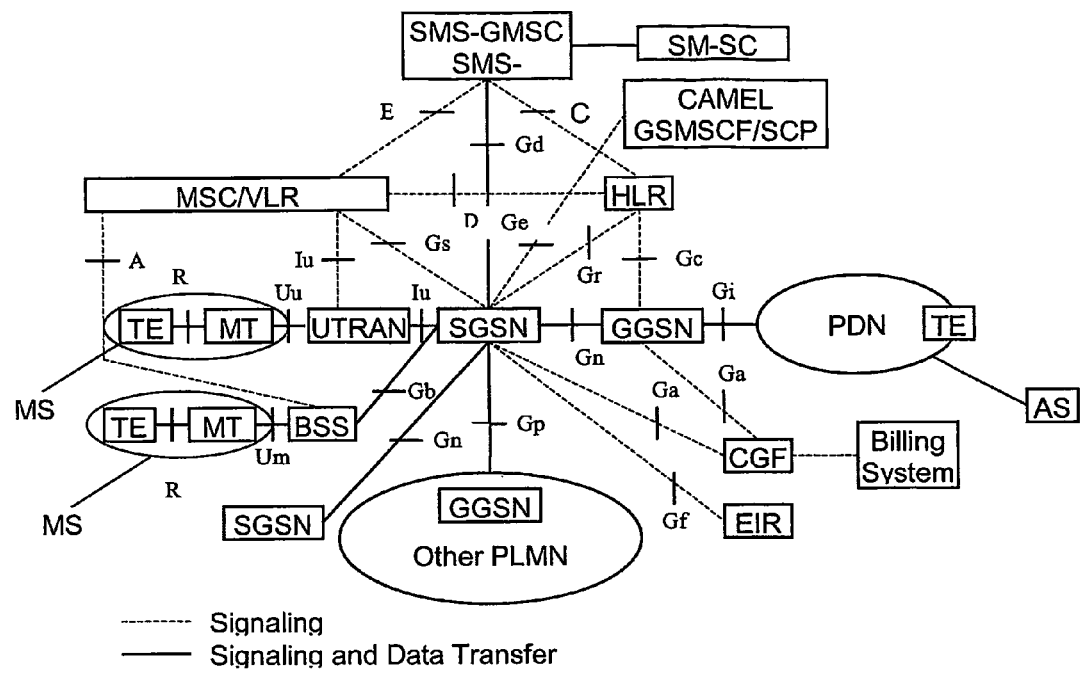
FIG. 1 shows an overview of the common domain core network according to the known 3GPP specification.
Figure 8:
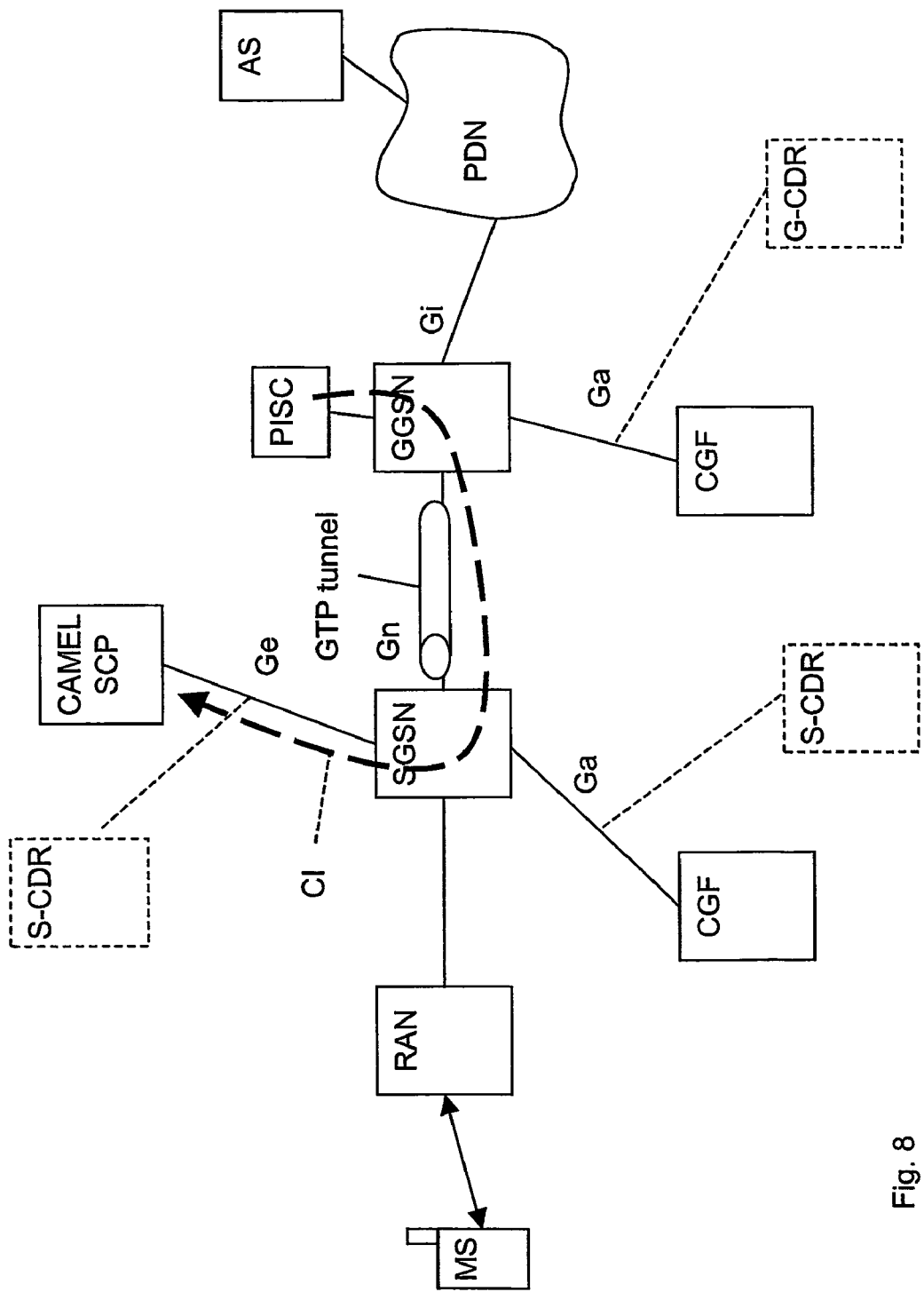
FIG. 8 is an overall illustration of the preferred embodiments according to the invention relating to a GPRS network comprising at least a serving GPRS support node (SGSN) and a gateway GPRS support node (GGSN), FIG. I a+b illustrates a charging and IP packet flow including packet construction for a first embodiment of the invention, FIG. II a+b illustrates a charging and IP packet flow including packet reception and CAMEL reporting for a first embodiment of the invention, FIG. III a+b illustrates a charging and IP packet flow including packet construction for a second embodiment of the invention, FIG. IV a+b illustrates a charging and IP packet flow including packet construction for a third embodiment of the invention, FIG. 9 discloses a first embodiment of an extension header type according to the invention, and FIG. 10 discloses a second embodiment of an extension header type according to the invention.

In FIG. 8, an exemplary illustration of a preferred embodiment has been shown relating to a GPRS network comprising at least a serving GPRS support node (SGSN) and a gateway GPRS support node. According to the invention, charging information (CI) relating to a particular PDP context for a given mobile station is gathered in the GGSN/PISC and is transmitted in a GTP header extension to the SGSN. The charging information is signalled at reception at the SGSN to a charging node (SCP) associated with the SGSN.

According to the invention, after a PDP context is activated for a given user, the GGSN resolves the kind of PDP (e.g. IPv4, Ipv6), and resolves the class of service of the PDP PDUs at the Gi interface. Examples of such service classes are MMS traffic, stock market information, positional information etc.

The present invention makes use of a Packet Inspection and Service Classification (PISC), such as the Ericsson FBC (Flexible Bearer Charging) system, for analyzing GTP traffic according to a given PDP context and hence according to a given user. The gateway node, GGSN, is communicating with the packet inspection and service classification system, PISC, to which IP packets may be communicated for identification of a given service class out of a number of predetermined service classes.

The analysis is performed on a packet-to-packet basis, and provides associated values of PDP context, estimated class of service value and associated payload volume value. The PISC data, in the following denoted class of service data and volume, may be evaluated, accumulated and transformed into reports. Since packet inspection is a difficult task, it may not always be possible to classify the payload packet transmitted; hence at least a non-successfully evaluated class of service value may be assigned to the class of service data. Depending on the extent the information can be classified, reports may be established which allows for a tolerance assessment or worst-case assessment.

For instance, it could be an object not to charge for more than provided, should any inaccuracy in the system be detected.

It should be noted that the PISC system could be an integrated part of the GGSN and the functioning could be based on software.

The above PISC system interacts with the GGSN and according to the invention the GGSN inserts class of service values in the stream of data transmitted to the SGSN. From here, the class of service data together with charging information obtained in the SGSN node is transmitted using normal CAMEL reporting procedures to the CAMEL SCP. This route for the charging information (CI) pertaining to a first embodiment of the invention has been shown in FIG. 8, which will be further dealt with under FIGS. Ia and Ib.

There is no restriction as to what and how many classes of services may exist, but the encoding scheme must be the same at the GGSN and the CAMEL gsmSCF/SCP.

According to the invention, at least one special extension header is added to a GTP-U header for a given GTP packet to be transported, on at least the Gn/Gp interface between the GGSN and the SGSN. In this special extension header data related to at least a particular service class for a given PDP context is stored. It should be noted that the class of service data carried in the special extension header might be associated with the subsequent payload carried under the extension header. However, the service class data of the special header extension is not necessarily associated with the payload of the GTP packet, which is carried under the given extension header.

The GTP header, as shown in FIG. 5, is flexible since the extension format according to the current GTP standard, as shown in FIG. 6, can be added to a default header.

According to a preferred embodiment of the invention, the list of GTP header extension types, defined in 3GPP TS 29.060, is provided with a new GTP-U header extension type, which indicates that the extension header comprises class of service information. For instance the marker value 0110 0000 can be used as "next extension header type' cf. FIG. 5, for indicating that a GTP extension header follows including service class information.

The extension header type may indicate that the receiver endpoint is not obliged to interpret the information and that it shall be passed on to the SGSN that transmits the GTP-U content towards the radio network. Setting Bits 8 and 7 of the marker value to adopt the values 0 and 0 accomplishes this task, cf. FIG. 7.

The above measures will make information available at the CAMEL SCP node, so that different ratings can be applied on a per payload class of service basis.

Figure 9:
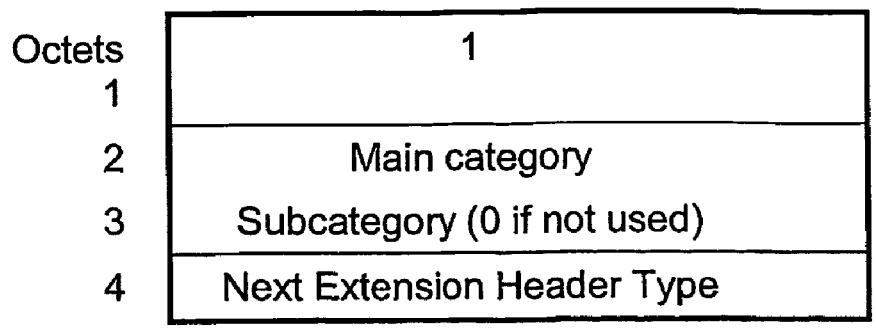

In FIG. 9, a first embodiment of an extension header type is shown. The first octet relates to the size of the extension header that in this case always has the size of 4 octets indicated by the length field value of 1.

The extension moreover comprises a main service class field and a subclass field. The provision or the use of the subclass field is optional. As required for extension headers, the last octet comprises a field for indication whether a further extension header is added in the GTP packet.

Figure 10:
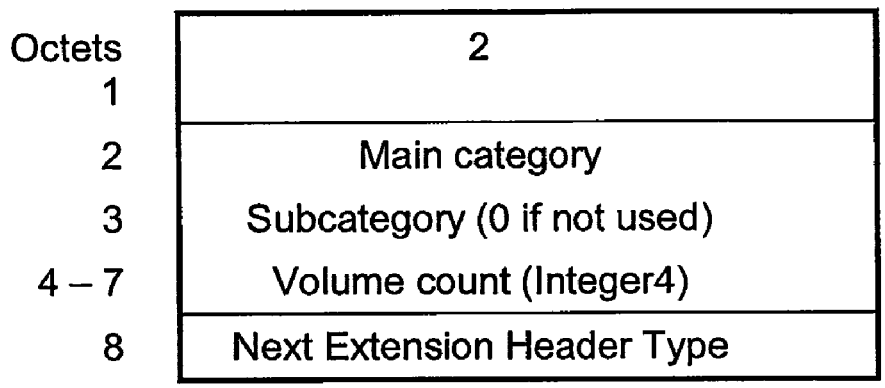
Figure 1A:
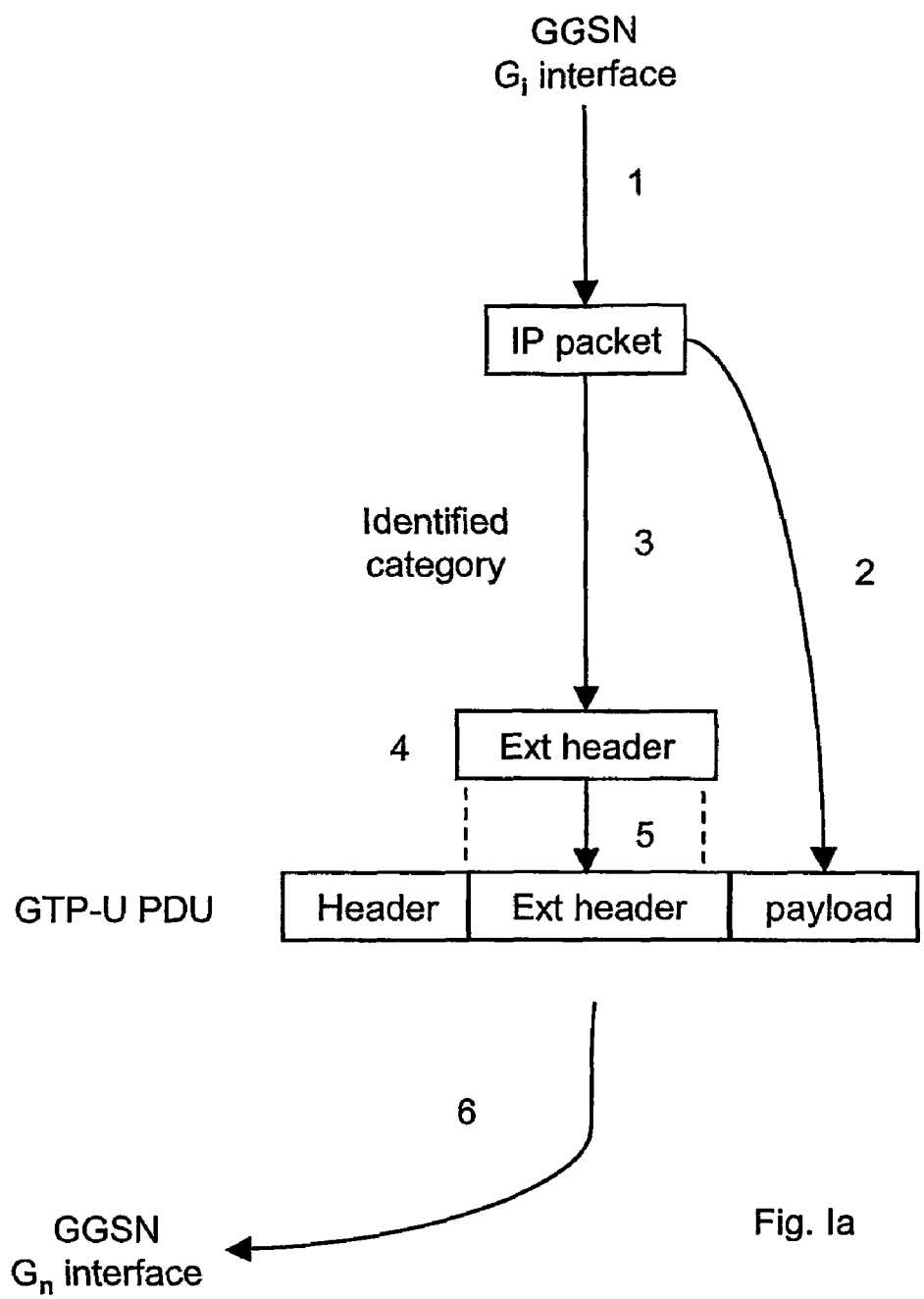
Figure 1B:
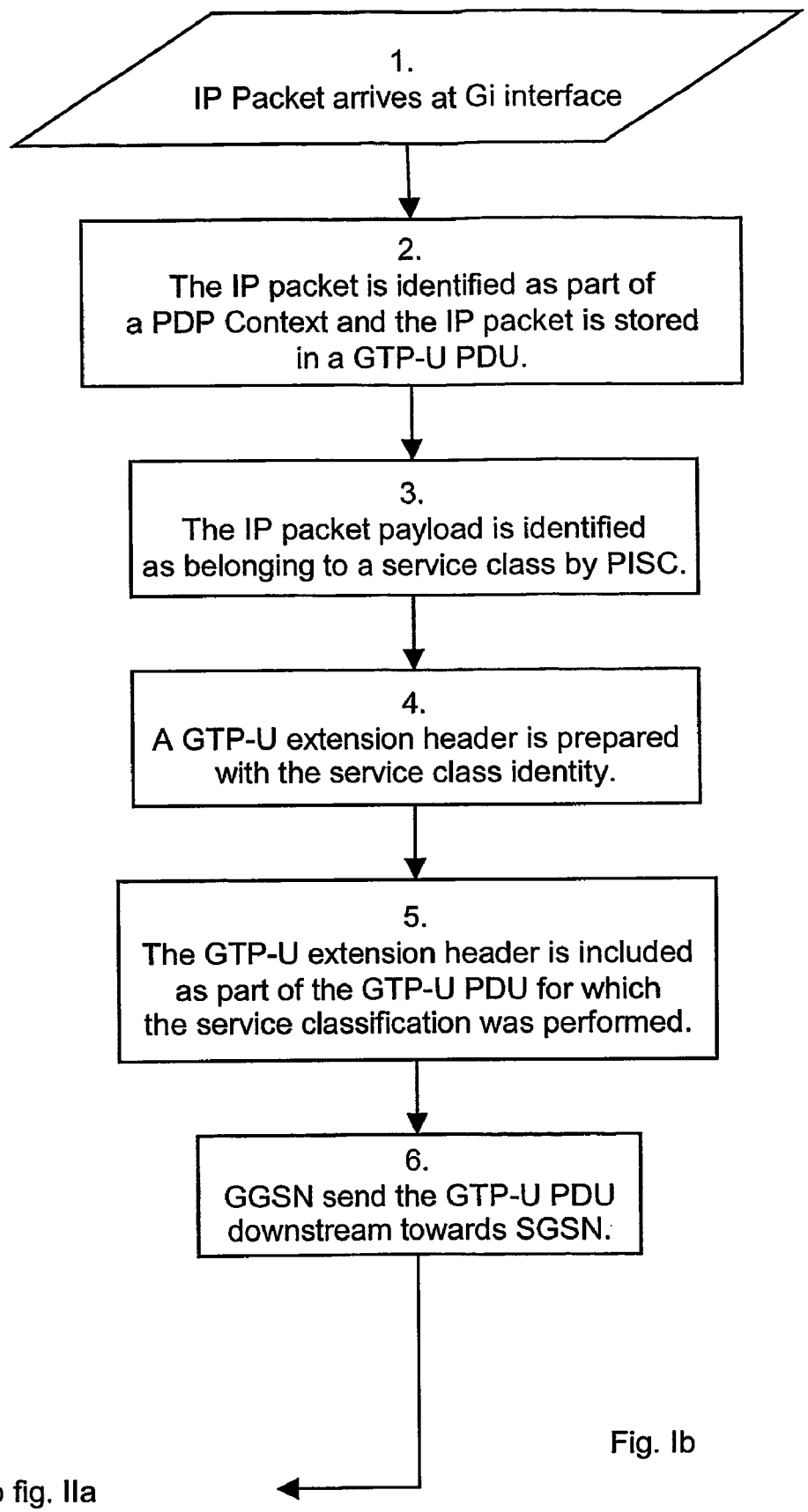

In FIG. 10, a second embodiment of an extension header according to the invention is shown. This extension header is larger than the first one and comprises additionally a volume count relating to how big the payload volume is for a given service class.

According to the preferred embodiment The Payload class of service information includes a "Class of service only" if the complete PDP payload in a GTP-U PDU has the same class of service or a "Class of service and volume" for other implementations, such as if the class of service information applies to part of the PDP payload in a GTP-U PDU or the class of service information applies (in part or full) to payload conveyed in another GTP-U PDU or if the class of service information applies to the PDP payload in more than one GTP-U PDU.

The "class of service only" GTP-U header extension format, shown in FIG. 9, is applicable if the entire PDP PDU payload in the GTP-U packet falls in the same class of service.

One "class of service and volume" GTP-U header extension, shown in FIG. 10, is inserted for each class of service, for which volume information shall be conveyed to the SGSN. This format is needed for conveying class of service information on uplink payload to the SGSN.

The Main class of service and Subclass of service encoding can be arranged as desired. It is envisaged that MMS traffic could constitute a first class of service, positional services constitute another class of service and all other traffic could constitute a third class of service. The subclass could be used for an additional level of resolution.

The SGSN maintains one counter for the volume of each service class, and subclass if provided, for a certain PDP context.

First Embodiment

FIG. I a & b

FIG. Ia+b illustrates the packet construction for a first embodiment of the invention.

In step 1 the IP packet arrives at the Gi interface in the GGSN. The IP packet payload is extracted. Subsequently the IP packet is identified as part of a PDP context and the IP packet is stored in GTP-U PDU. The Packet Inspection and Service Classification (PISC) analyses the content of the payload and identifies a service class value for the IP packet in step 3. Thereafter, a GTP-U extension header containing the identified service class value is prepared in the GGSN, confer step 4. This special extension header is inserted, see step 5, as part of the GTP-U PDU for which the service class value was assigned. Finally, in step 6, the GGSN sends the GTP-U PDU downstream towards the SGSN.

FIG. II a & b

In FIG. II a & b the subsequent actions taken in the GGSN for the first embodiment is illustrated. The GTP-U PDU mentioned above is reaching the SGSN on the Gn interface as shown in step 1. In step 2', the service class value is extracted from the extension header. The SGSN measures the payload volume of the incoming packet and stores the service class value of the payload, step 3'. This volume information is accumulated for given respective service classes for a given PDP context in the SGSN reporting unit.

Following normal CAMEL reporting procedures, the SGSN reports CAMEL measurement, as shown in step 4. More specifically, the Ge interface CAP operation ApplyChargingReportGPRS is augmented with information on classified payload. The class of service counters are reported to the SCP in a new information element ClassifiedPayload in the known ApplyChargingGPRS operation to the SCP. This transfer may for instance be performed over a SS7 network.

The SCP, which maintains the balance of the subscriber's account, may use the classified payload information for rating. The information elements specified in the present 3GPP specification for the ApplyChargingReportGPRS CAP operation are not affected, i.e. payload volumes and thresholds are still reported with total amount of payload. Inclusion of measurement reports of classified payload is conditionally added to the ApplyChargingReportGPRS CAP operation in a backward compatible way.

The SCP must have a list of service classes that affects the rating of payload transfer. The SCP may prepare the SGSN to report only those service classes in the ApplyChargingGPRS operation:

Reporting classified payload volume does not mandate classifying all payloads. Such "not classified" payload can be inferred from the total measured payload, reduced with the sum of all classified payload. The non-classified payload may be assigned to a default class as opposed to perform volume charging.

The SCP uses the standard CAMEL procedures to shut down services when the account is exhausted.

One advantage of the invention is that the classified payload measurements—that are best produced at the GGSN where the GTP tunnel is ended, the PDP type is known and the PDP payload is observable—are made available to an SCP over the known Ge interface from the SGSN without requiring any new interfaces. Moreover, the transfer of service class and size information from the GGSN to the SGSN does not require any new GTP PDU type, or any other protocol. The transfer according to the invention would constitute an optional feature and is a backward compatible extension to the GTP-U PDUs that are handled by existing SGSN/GGSN. Moreover, given the GGSN provides the payload service class information for downlink payload in the same GTP-U PDU as the actual payload transfer. The classified measurement fulfils the same accuracy requirements as the local measurement of total downlink payload at the SGSN. Also, the transfer of service class and volume information from the SGSN to the SCP using the Ge interface is a backward compatible extension to existing CAP operations and do not affect prior art CAMEL reporting procedures.

For the embodiment corresponding to FIGS. Ia+b and IIa+b downstream packets are reported as shown. Upstream packets may be provided separately using the known CAMEL interface.

In steps 2 and 3, an alternative path is shown for the case wherein both volume count and service class is provided in the extension header. In step 2 both the service class and volume count is extracted. Consequently in step 3, the values are a stored as separate information of the PDP context.

Second Embodiment

FIG. IIIa+b

In FIG. III a+b a second embodiment of a charging and IP packet flow according to the invention has been shown.

A first down stream IP packet arrives at the GGSN at the Gi interface, step 1.

The first IP packet is identified as part of a PDP context and the packet is stored in a first GTP-U PDU, step 2.

By way of example, the first IP packet payload class can not be identified separately, step 3.

The PISC saves measurement information of the non-classified IP packet payload, step 4.

The GGSN transmits the GTP-U PDU downstream towards the SGSN, step 5.

According to step 5', steps 1-5 may be repeated before continuing.

In step 6, a second exemplary downstream IP packet arrives at the Gi interface.

The second IP packet is identified as being part of the same PDP context as the first non-classified IP packet and the received IP packet is stored in a GTP-U PDU, step 7.

The second IP packet is identified and classified by the PISC, step 8.

The first non-classified IP packet is correlated to the second IP packet, so this service class is assigned to both the first and the second IP packets, step 9. The correlation may be based on the type of used protocol, source address, port number as well as potential underlying protocol specific information.

A GTP-U header is prepared with the service-classified identity and associated volume count, whereby the volume count represents the sum of the not yet reported volume count of the service class for the PDP Context, step 10.

The GTP-U header is included as part of a second GTP-U PDU for which the classification was performed, step 11.

Finally, the GGSN transmits the second GTP-U PDU to the SGSN.

When the two above GTP-PDUs are received in the SGSN, the PISC data is extracted in so far as extension headers are provided in respective GTP-PDUs. This procedure corresponds closely to the one illustrated in FIG. IIa and b.

An alternative embodiment could also be envisaged that identifies a first service class for a first but not a second later IP, packet—in this case, the classification should be stored and assigned for the second packet.

In the second and third embodiment explained above, the PISC performs a partial or incomplete classification and stores incomplete classifications and associated volume counts in memory. The term partial classification should be understood in the sense that it is not possible to unambiguously identify the given payload, of a given volume count, to a specific service class. This means that the given volume count cannot be reported as part of a specific class at that particular moment. Additional information gathered from succeeding payload packets of the same service are needed for an unambiguous classification of the aggregated volume of the payload in question belonging to a given PDP context.

Third Embodiment

FIG. IVa+b

In FIG. IV, an example has been shown which relates to a PDP context session in which messages are both transmitted upstream (on the up-link) and downstream (the down-link).

In step 1, an upstream GTP-U PDU arrives at the Gn interface of the GGSN.

A first IP packet is extracted from the GTP-PDU, step 2.

The first IP packet payload is identified and classified by the PISC if possible, step 3. By way of example the first IP payload is identified as belonging to a first service class.

The PISC saves information for the classified first IP packet associated with the given PDP context, step 4. A cumulative volume pertaining to a respective service class and PDP context is updated in the PISC.

The GGSN sends the upstream IP packet towards the Gi interface, step 5.

The steps 1-5 may be repeated before continuing. If more upstream packets arrive and no downstream packet arrives, the volume count of classified upstream payload packets are accumulated until a downstream payload packet for the same PDP Context appears.

If no more upstream packets or if a downstream packet arrives, the process moves on to step 7, whereby a first arriving downstream payload packet will carry the in PISC accumulated classified volume counts for the same PDP Context.

If no more upstream packets and no downstream packets arrive, the process moves on to step 10.

The procedures of both classification and of accumulation of volume reports from both fully classified and partial classified payload volume are maintained as long as the PDP Context is active. Not yet reported volume counts at PDP Context deactivation are simply discarded or is transmitted in an empty GTP-U packet.

In step 6, the SGSN may await more IP packets belonging to the PDP context and resume the steps 1-5 for subsequent packets. When a downstream second IP packet arrives belonging to the same PDP context the accumulated classified volume counts are reported, arranging associated values of service class and volume count in a separate extension header.

The downstream second IP packet is stored in a GTP-U PDU, step 7.

The second IP payload is identified and classified by the PISC, step 8. By way of example, the second IP payload is identified as belonging to a second service class.

In step 9, the second IP packet is identified as part of the same PDP context as the earlier non-reported first IP packet payload measurement.

A first GTP-U extension header is prepared carrying the service class identity from at least one saved measurement of upstream IP packets, step 10. By way of example, the payload is of a first service class type.

The first GTP-U extension header, step 11, is included as part of the downstream GTP-U PDU.

A second GTP-U extension header is prepared with the identified service class identity of the downstream second IP packet, step 12.

The second GTP-U extension header is included as part of the common GTP-U PDU, step 13.

The GGSN transmits the common GTP-U PDU, step 14.

In the above embodiment above, the GTP-PDU carry more than one extension header. One extension header is added for each new category being reported.

According to the embodiments set out above, true real-time control over GPRS resource usage is achieved. The first embodiment has the advantage of providing a very fast reporting. The second and third embodiments do not provide for as swift a reporting as the first embodiment, but provides a higher reliability of the service classification.

Thereby GPRS pre-paid service is accomplished which provides for separate charging per service utilisation of payload transport. According to an advantageous aspect of the invention, the service-related payload is deducted from the gross payload, whereby charging can be accomplished for both PDP context usage and services.

As mentioned above, existing protocols and interfaces, such as the known CAMEL reporting mechanisms are used such that the embodiments are backward compatible with the current 3GPP standard.

ABBREVIATIONS

CAMEL Customised Applications for Mobile network Enhanced Logic
CDR Charging Data Record
CGSN A node combining SGSN and GGSN functionality
Ge CAMEL interface between GSM-SCF and SGSN nodes
GGSN Gateway GPRS Support Node
Gn Interface between two GSNs within the same PLMN
Gp Interface between two GSNs in different PLMNs. The Gp interface allows support of GPRS network services across areas served by the cooperating GPRS PLMNs
GPRS Packet Services for GSM, UMTS or GERAN systems
gprsSSF GPRS Service Switching Function
GSM Global System for Mobile communications
GSM-SCF GSM Service Control Function (in spite of the "GSM", applies to GPRS and UMTS as well)
gsm SCF GSM Service Control Function
GTP GPRS Tunnelling Protocol
GTP' GTP variant for transporting CDR information
GTP-U GTP User Plane
HPLMN Home PLMN
MMS Multimedia Messaging Service
MS Mobile Station, the MT and TE together
MT Mobile Terminal
PDP Packet Data Protocol.
PDU Protocol Data Unit.
PLMN Public Land Mobile Network
SCP synonym for GSM-SCF
SGSN Serving GPRS Support Node
TE Terminal Equipment
UMTS Universal Mobile Telecommunications System
VPLMN Visited PLMN

The invention claimed is:

1. A method of communicating charging information for a particular mobile station in a network including at least a serving node and a gateway node, comprising the following steps:
receiving, at said gateway node, a data packet comprising a header and a payload;
identifying a particular Packet Data Protocol (PDP) context for a particular mobile station;
gathering, at said gateway node and from said received data packet, charging information relating to said PDP context;
creating a General Packet Radio Service (GPRS) Tunneling Protocol (GTP) packet data unit, said GTP packet data unit including a header, a payload, and a pre-determined extension header; and
transmitting, from said gateway node to said serving node, said GTP packet data unit containing said charging information, wherein
said charging information relates to said PDP context for said mobile station,
said pre-determined extension header is reserved for
service class information pertaining to at least one Internet Protocol (IP) packet payload for said PDP context, and
volume count information indicating a data volume of the payload, if said service class information applies to a payload of more than one GTP packet data unit, and
said header comprises a next extension header type indicating that said pre-determined service class extension header follows.

2. The method according to claim 1, wherein said network includes a charging node associated with said serving node, the method further comprising the following steps after said transmitting step:
receiving, at said serving node, said charging information; and
sending, from said serving node to said charging node, information corresponding to said charging information.

3. The method according to claim 1, wherein said gathering step further comprises the following steps:
performing a packet inspection of said received data packet; and
assigning a predefined service class for said data packet based on said packet inspection.

4. The method according to claim 2, wherein said charging node comprises a Customized Application for Mobile network Enhanced Logic (CAMEL) Service Control Point (SCP) node and said charging information is signaled by means of the CAMEL Application Part (CAP) protocol.

5. The method according to claim 1, wherein said network comprises a GPRS network, said serving node comprises a Serving GPRS Support Node, and said gateway node comprises a Gateway GPRS Support Node.

6. A gateway node for communicating within a system performing packet inspection and service classification, said system including a packet data network and a serving node, wherein Internet Protocol (IP) data packets are communicated for identification of a given predetermined service class out of a plurality of predetermined service classes within said system, said gateway node comprising:
means for receiving, at said gateway node, an IP data packet from said packet data network;
means for extracting the payload of said IP data packet;
means for determining a value, out of a plurality of values corresponding to a plurality of different service classes, said determined value corresponding to a service class for said payload;
means for assigning said determined service class to a service class extension header;
means for assigning, to the service class extension header, volume count information indicating a data volume of the payload if the determined service class applies to a payload of more than one packet data unit;
means for creating a packet data unit by including said service class extension header;
means for inserting said payload in said packet data unit; and means for transmitting said packet data unit from said gateway node to said serving node.

7. A gateway node for communicating within a system performing packet inspection and service classification, said system comprising a packet data network and a serving node, wherein Internet Protocol (IP) data packets comprising payload data are communicated for identification of a given predetermined service class out of a plurality of predetermined service classes within said system, said gateway node comprising:

means for receiving IP data packets in a continuous upstream of IP data packets associated with a given PDP context;

means for determining the service class of the payload data of said IP data packets associated with said PDP context;

means for storing an accumulated uplink volume count associated with said service class;

means for storing an accumulated downlink volume count associated with said service class;

means for generating service class extension headers for upstream payload, said headers containing said service class and said accumulated uplink volume count if said service class applies to a payload of more than one packet data unit;

means for generating service class extension headers for downstream payload, said headers containing said service class and said accumulated downlink volume count;

means for inserting said extension headers for said downstream payload in packet data units;

means for inserting said payload data in packet data units; and means for transmitting said packet data units to said serving node.

* * * * *

UNITED STATES PATENT AND TRADEMARK OFFICE
CERTIFICATE OF CORRECTION

| | | |
|---|---|---|
| PATENT NO. | : 7,844,250 B2 | Page 1 of 1 |
| APPLICATION NO. | : 10/596014 | |
| DATED | : November 30, 2010 | |
| INVENTOR(S) | : Olsson et al. | |

It is certified that error appears in the above-identified patent and that said Letters Patent is hereby corrected as shown below:

In Fig. 3, prior art, Sheet 2 of 14, in Line 1, delete "Applicatio" and insert -- Application --, therefor.

In Column 1, Line 56, delete "through-put." and insert -- throughput. --, therefor.

In Column 8, Line 30, delete "operation:" and insert -- operation. --, therefor.

In Column 10, Line 10, delete "down-link)." and insert -- downlink). --, therefor.

Signed and Sealed this

Sixteenth Day of August, 2011

David J. Kappos
*Director of the United States Patent and Trademark Office*